Sept. 9, 1958 T. K. MARBURY 2,850,843
SOIL IRRIGATION SYSTEM
Filed July 19, 1957 2 Sheets-Sheet 1

Thomas K. MarBury
INVENTOR.

Sept. 9, 1958 T. K. MAR BURY 2,850,843
SOIL IRRIGATION SYSTEM
Filed July 19, 1957 2 Sheets-Sheet 2
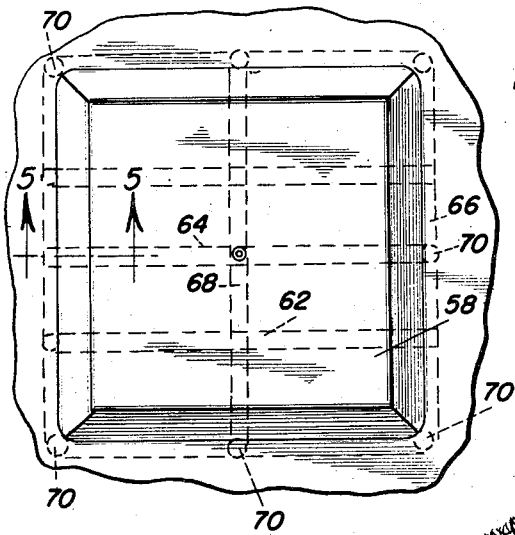
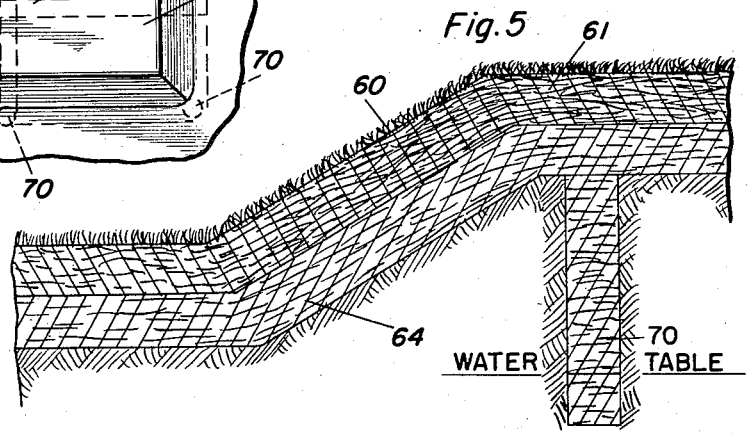
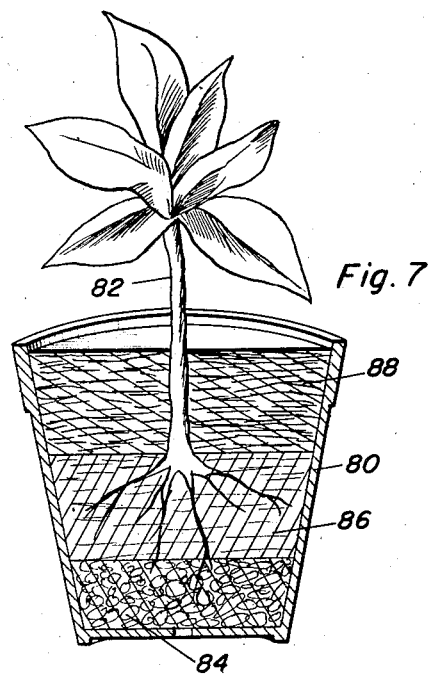
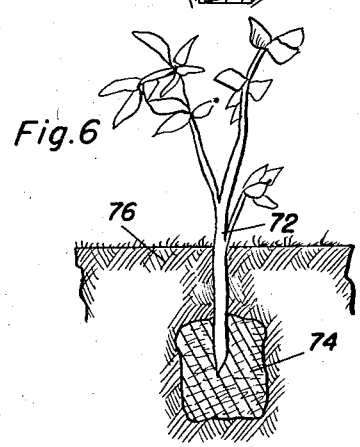
Thomas K. MarBury
INVENTOR.

United States Patent Office 2,850,843
Patented Sept. 9, 1958

2,850,843

SOIL IRRIGATION SYSTEM

Thomas K. MarBury, Bay Pines, Fla.

Application July 19, 1957, Serial No. 672,939

4 Claims. (Cl. 47—58)

This invention relates to subsoil irrigation systems and more particularly to the means and method for irrigating vegetation without resorting to mechanical conduits of any type.

As an example of the great lengths that man has resorted to obtain sufficient moisture for reasonable sustenance of vegetation on farm land, drastic measures were taken in the States of California, Texas and Kansas. Certain farms had giant size plows constructed. These plows were capable of subsoil working and turning to a depth of about 6 feet to obtain clays holding moisture very well below the evaporation level. The cost of operating such a tractor to say nothing of the original investment in the plow and tractor, is very appreciable. Moreover, such plowing is temporary in that the moisture obtained in this way mixes the clap and top soil causing the top soil to bake. On the other hand, my invention stores a copious quantity of water in a protected subterranean repose and has the other advantages such as self-charging during each rain and automatic supplying of water to the tender roots of the vegetation or trees only when demanded by the vegetation or trees, with no water flowing down on vegetation to leach out fertilizers.

There are three principal methods of artificial irrigation of vegetation. Open trenches, overhead and subterranean or surface level conduits are the three current types of irrigation, practiced in general throughout the country. The cost of installing a subsoil (usually of clay pipe) or surface level irrigation system which involves mechanical pumps, wells and expensive labor, is in many cases prohibitive. Moreover, there is a maintenance problem to contend with plus electric current failures and water shortages. Open ditch irrigation is practiced in many parts of the country but tractors alter them and standing water breeds mosquitoes so here, too, maintenance problems exist. Moreover, there is an evaporation rate that causes water costs to become excessive. Another difficulty is that weeds grow around the ditch and use an appreciable percentage of the water that is conducted in the open trenches.

Accordingly, it is an object of my invention to provide an irrigation system which requires little or no maintenance and which serves the vegetation continuously and not intermittently as in ordinary irrigation systems. My invention surrenders moisture when needed and is in the nature of a subsoil irrigation system, but is possesses properties of being non-clogging and capable of storing water for long periods of time to be used when demanded by the parched soil, and more particularly by root penetration into the clay systems.

In a current irrigation system there must be a source of water. More often than not, this source of water is a deep well or a number of deep wells. Original costs in sinking such wells are high and sometimes the useful life of such well is short. Current irrigation systems have only one intention and are capable of doing but one job and that is to distribute water where it is needed and when it is needed. The water is channeled by the farmer in accordance with available labor and may not be with the vegetation requirements. While my invention is on guard to continuously supply the required moisture many mechanical devices are available for facilitating the farmer's task. I have reference to automatic valves and automatic devices or semi-automatic devices for distributing water over selected parched areas. In no case, though, is the irrigation system inherently capable of storing moisture for any appreciable duration. Therefore a power failure or water shortage may ruin his vegetables or fruit. It is a further object of the invention to provide an irrigation system which is capable of not only distributing water where necessary, but also capable of storing water for long periods of time. The water store is below grade so that the ravages of the sun's energy do not cause excessive evaporation. Furthermore, the nature of my invention is such that rainwater is retained long after the surface water has been used by the vegetation and/or evaporated.

Fertilizers have been considered necessary in practical farming operations for a number of years. For a while liquid fertilizers were considered to be ideal because they penetrated the soil and they are easy to apply by simple mechanical sprays. However, it is found that the high evaporation rate of liquid fertilizers makes them expensive. To combat this, machinery has been developed which penetrates the soil several inches and discharges a charge of liquid fertilizer. This is a mechanical attempt to solve the evaporation problem. It is only partially satisfactory due to the sun's rays evaporating ammonia and like chemicals.

A further object of this invention is to provide improvements in fertilizing methods and means by providing a subsoil storage facility for liquid, gaseous or water soluble fertilizers. The subsoil store consists of a quantity of clay that is capable of absorbing and retaining an appreciable quantity of water and/or fertilizer from which vegetation roots, such as those of plants, trees, grass, etc. may feed. When such fertilizer is spent, it is capable of being renewed not at or in the soil but in the store material that is protected from the sun's rays beneath at least several inches of soil.

The invention involves a permanent improvement in an orchard, farm land, garden, golf greens, lawns, etc. by the installation of submerged irrigation means requiring no water wells, ponds or springs or other water sources, requires no pumps, pipes or ditches and yet, irrigates the land sufficiently to support growth of various crops or trees. Ordinary irrigation systems merely conduct water and apply it to the soil, and usually at the wrong time after the vegetation has been hurt with caked surface. This invention not only distributes the water evenly, but does it automatically when needed, and not after labor is available to supply water. Moreover, the practice of the invention will provide for the collection of rainwater and the holding it in preparedness for dry seasons.

A typical embodiment of the invention has a quantity, for example a layer, bed or bore filled with one of the available clays or other minerals capable of absorbing quantities of water which are large in comparison to the surrounding soil's capability and capable of retaining these quantities of water for durations, which are large in comparison to the water storing capability of the surrounding soil. There are a very large number of clays available in America. They have different properties and some are more plentiful than others. Clays like fuller's earth or kaolin are practically non-swelling and in some regions of the country are inexpensive and readily available. Swelling clays which, like western bentonite readily absorb and store large quantities of water may be used for the subterranean water and/or fertilizer storing means. Other available clays have different swelling and compacting properties but may be used to practice the invention. In or near areas which do not have available clays such as the montmorillonite type or the sillimanite type will best utilize the available clays. Clays having properties throughout an entire range of absorption and swelling and compacting properties may be used with discretion as to the application. For example highly colloidal clays such as western bentonite are not suggested below a golf green because even though the high colloidal bentonites will store a tremendous quantity of water per unit volume of clay, for the purpose of my invention the swelling of colloidals would be objectionable beneath a golf green, lawn or cemetery lot but not objectionable in a field where swelling and retraction of the top soil will cause no damage.

It is estimated that a practical application of the invention will involve a layer of clay approximately two feet thick and located about 8 inches to a foot below the surface of the soil. If this layer is in the form of a trench, for example between or near rows of trees in an orchard, and if watered at the time of installation, most trees, depending on their age and the type of trees, will not require artificial watering even if there is no appreciable rainfall for several months. Such a trench has the non-obvious property of surrendering moisture to the surrounding soil and to the feeder roots of the trees usually embedded in the clay water reservoir, the surrounding soil is drier than the clay-water store. However, during a rainfall when the soil is more saturated than the clay, the flow of moisture is reversed so that the store of water becomes recharged. In other words, during a rain the clay absorbs moisture from the water, surrounding soil. During a drought or a dry soil, the clay surrenders moisture to the same soil. This is automatic in the sense that no human care is required.

The cost of installing an irrigation system in an orchard as in the example above, is very considerably less than the installation of an artificial subsoil or surface irrigation system which will involve a source of water, such as a well, plus distribution conduits, and depending on human efforts.

A further object of the invention is to provide means by which the store of water and/or fertilizer is materially enlarged in capacity. One embodiment of such means are vertical bores in the ground which are in registry with the bottom of the layer of clay. These bores will accommodate additional clay and may accommodate a variety of clay different from that in the trench to take advantage of different moisture absorption qualities that are beneficial to the overall system. For example the clay in the bores may be capable of elevating more moisture than the clays above or less moisture if the vegetation requires it. Another alternative would be to provide a large quantity of slow migrating fertilizer in the bores.

The principles of the invention are applicable in many environments. On a small scale, nurseries, gardeners and businesses interested in the growth of small plants or trees may use the method and means of my irrigation system to advantage. On a large scale it is contemplated that farms and orchards practice the invention by slightly different techniques. Custom work will involve the preservation of golf greens or like areas ordinarily requiring expensive maintenance capable of being reduced by the principles of the invention. I emphasize the economic importance of the invention inasmuch as a material reduction in operating costs of farmers, orchard growers, etc. may be achieved and ultimately the savings will at least in part be passed on to the consumer.

Where dry fertilizers are still used in planting, water coming up to the plants does not melt or leach the water soluble chemicals. Ordinary surface irrigation has the water fed from the top and soak into the soil to seek lower levels and in so doing the water soluble chemicals of the fertilizer are leached. When, as in my invention, there is subsoil feeding, this condition does not exist except during nature's rain.

The U. S. Department of Agriculture instructs commercial tomato growers to prevent the foliage and fruit of tomato plants from becoming wet during irrigation. Open ditch irrigation is suggested. However, in many localities open ditch irrigation is inoperative because the land is too flat. My invention solves the commercial tomato grower's problem by feeding moisture or fertilizer from below.

My invention has the advantage of increasing production in all vegetation, with no additional seed, labor or fertilizer. It is believed that the chemicals in the montmorillonite combine or react with those in the fertilizer making the fertilizer more available to plant root absorption, producing greater foliage and fruit, vegetable and grain. It is also believed that the great moisture holding voids of montmorillonite and other mineral absorbers can hold enough moisture to smother nematodes and other vermin by moisture crowding out the air usually present in growing soils. A further advantage is in the horizontal portion of my trench, to transmit water sidewise from the vertical bores.

Other objects and features of importance will become apparent in following the description of the illustrated forms of the invention.

Figure 4 is a top view of a presently built golf green with which the invention is surrounding same with lead-in channels;

Figure 5 is an enlarged sectional view taken on the line 5—5 of Figure 4;

Figure 6 is a fragmentary sectional view showing a cutting being applied in a garden or container and showing a further application of the invention; and Figure 7 is a fragmentary perspective view showing a flower pot in which there are layers of soil and moisture storing mineral by which to feed the vegetation.

Figure 1:
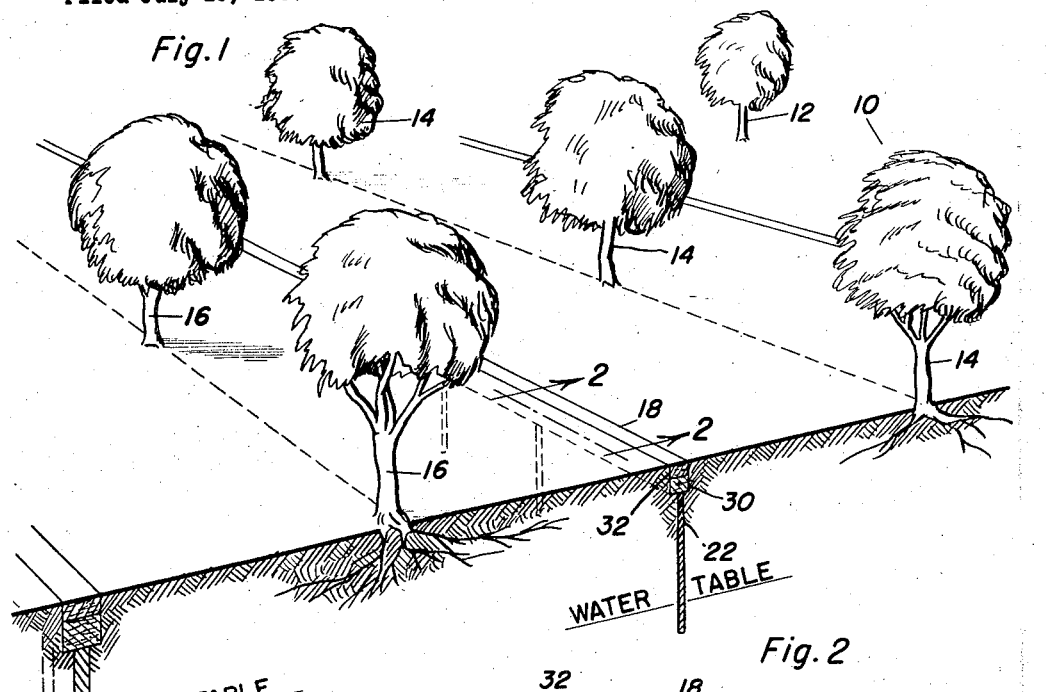
Figure 1 is a fragmentary perspective view of an orchard typifying any orchard, grove of trees, vegetables or the like regardless or whether the tree is fruit bearing or not, this view showing one form of the invention being practiced in connection therewith.

By the term vegetation I intend to include all types of growing vegetable matter which have need for moisture to sustain growth. This will include fruits, vegetables, plants of all types, trees, bushes, grass and all others known to a skilled botanist or agrarian. One example in practicing both the method and means for carrying out the invention, is typified in Figures 1 and 2. The orchard 10 is made of rows 12, 14 and 16 of trees. The rows are spaced apart in accordance with soil porosity which is accepted practice. Irrigation and/or fertilizing is achieved by the subsoil irrigation means detailed in Figure 2. These means consist of a trench 18 formed in the ground between rows 16 and 14. Any number of such trenches will be used in the orchard in accordance with the needs of the orchard as dictated by the type of soil and trees, the average rainfall and other factors peculiar to the locality of the orchard. Bores 20 and 22 are drilled or otherwise formed in the ground and open through the bottom wall 24 of trench 18. A comparatively non-compacting and non-expanding clay is formed in columns 26 and 28 in the bores 20 and 22. A number of examples have been given previously, however, a further suggestion is to use fuller's earth or kaolin clay or a clay similar to it in absorption and expansion and compacting properties. A layer 30 of clay is applied in the trench 18 and is in union with the columns 26 and 28, any number of which are used in accordance with the demands of the particular vegetation or orchard in question. The layer 30 of clay may be kaolin or a clay which has slightly different properties of water absorption capacity. A protective layer 32 of top vegetation soil is in trench 18 over layer 30 to prevent the sun's rays from evaporating the moisture from the layer 30 even though certain parts have no vegetation.

A number of additives can be placed within the water stores in order to vary the porosity of the store. For example vermiculite, diatomaceous earth or other moisture absorbers could be added and mixed thoroughly with the clay. Farmers are familiar with the availability of fertilizer which liberates desired nitrogen very slowly. In fact, unfortunate experiences with the slowness of nitrogen liberation have been reported in that the fertilizer was past the growing season before appreciable liberation took place. Such fertilizers could be better used with and as a part of my invention in that they may be applied in copious quantities within the bores 20 and 22 and/or within the layer 30. To renew them or to apply any other kind of fertilizer, such bores are made through the top soil 32 and into the bores 20, 22 and all others like it or even a selected pattern may be followed such as every other bore 20 or every third or second bore 20 or 22. A further use would be to penetrate only the layer 30 for the application of any kind of fertilizer.

The method involved in my invention can be practiced by the arrangement described above. My method consists in the steps of storing liquid within a volume and feeding vegetation, for example plants, trees or grass, etc. by the seepage of moisture from the absorbent store. Such moisture may be accompanied by a fertilizer or may be merely moisture. However, the method involves also the further step of returning moisture to the store when there is an excessive of moisture in the soil surrounding the vegetation. An example of such a condition is during a rainy season since the surrounding soil becomes more wet than the mineral store.

Figure 2:
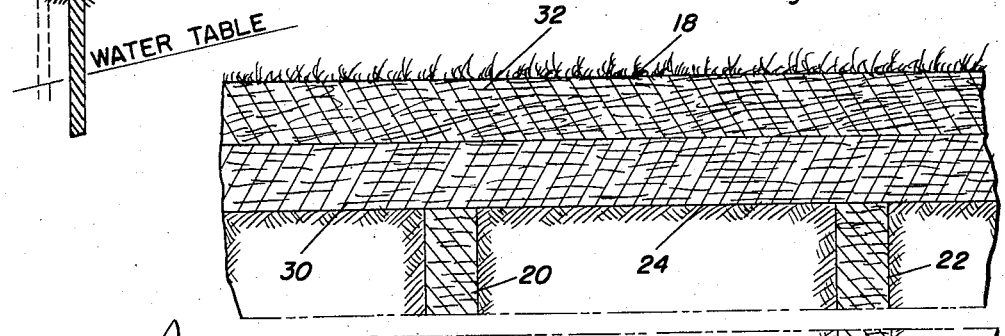
Figure 2 is an enlarged sectional view taken on the line 2—2 of Figure 1 showing the capillary attraction shafts to water table.
Figure 3:
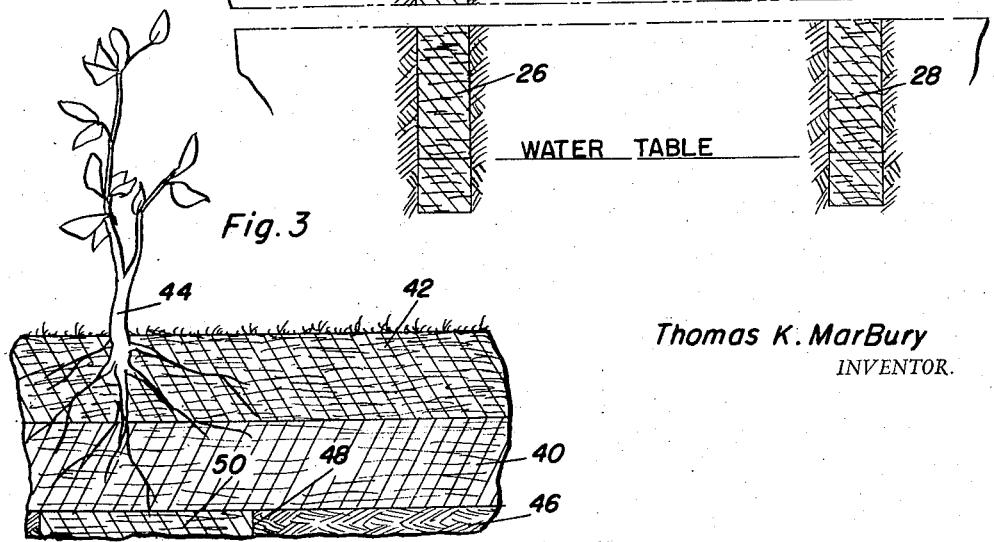
Figure 3 is a fragmentary sectional view showing the adoption of the principles of the invention with another type of vegetation, this view also showing that a plant, tree, etc. may be placed directly over one of the ground bores in union with and extending downwardly from the mineral constituting the liquid store for capillary attraction of moisture.

Reference is now made to Figure 3 showing a slight variation in the invention. The store for the liquid need not be in the form of a trench. Accordingly, layer 40 of Figure 3 is of indefinite width and is more like a bed than a strip (Figure 1). Here again, the store for the liquid is protected by a layer of top soil 42 within which plant 44 is growing. Layer 40 rests upon the soil 46 that is formed with spaced bores 48. These bores accommodate a mineral moisture absorbing and storing material 50 such as one of the previously mentioned clays or a clay like any one of the previously mentioned clays. Another distinction between Figure 3 and Figure 1 is that the plant 44 has its roots growing in layer 40 and is located above bore 48. The sump that is formed by the packed bore 48 provides a long lasting supply of moisture for the plant 44. The distinction between the method practiced by an organization shown in Figure 1 and the method practiced by an organization shown in Figure 3 is that the moisture for the plant 44 is fed directly upwardly from the material 50 and material 40 whereas, the moisture for the trees in the rows 12, 14 and 16 is fed not only upwardly but laterally. In either case the feeding of the vegetation is achieved when demanded by the vegetation. In any case the liquid stores which may be originally charged and subsequently serviced with fertilizer, are self-renewing during rainy seasons. Under very unusual drought conditions where water tables are many feet below top soil artificial watering may be necessary even though my invention is applied to the soil. Assuming that there is a drought condition of serious proportions in the area, the water source that is available will continue to surrender liquid to the surrounding soil and the feeding roots of the vegetation. Clays are known to absorb up to thirty times their own weight in additional water. When this huge quantity of water has been dissipated and still there is no rain, the clays that are used in my invention will be the recommended western bentonites that have high abosorption. Thus, a single application of copious quantities of water will supply the vegetation. What would ordinarily be wasted additional water will not, in fact, be wasted. The reason is that it will be demanded and seized by the anhydrous clay, only to be gradually surrendered should a dought condition continue to exist.

For golf greens the principles of the invention are applicable in special arrangements. For example in Figures 4 and 5 I have illustrated a golf green 58 whose grass carpet 60 would ordinarily be watered daily in the absence of rain. A layer 61 of top soil is beneath the grass so that the grass may obtain necessary nutrients for sustenance.

Golf greens will require maintenance regardless of the presence of the invention, but the watering necessity can be materially reduced by providing a layer of non-swelling clay beneath the top soil 61. This layer may assume many configurations such as a lower layer for the entire green or such as strips 62 and 64 extending across the green, strip 66 extending around the green, and any number of cross trenches 68 extending beneath the green and joining to the trenches 62, 64 and 66. Bores 70 are at the bottoms of the trenches and they register with the trenches. These bores, like the previously described bores in the soil may be formed by any kind of machinery, manual or power assisted, and contain either the same type or a different type of clay from that in the trenches. Gradual watering of the soil layer 61 supporting the grass 60 is achieved in this way.

In Figure 6 a cutting 72 is in a quantity of moisture retaining clay 74 and placed in the ground 76. Clay 74 constitutes a moisture store from which the cutting 72 may draw necessary moisture.

In Figure 7 there is a flower pot 80 in which several layers of material are disposed for the plant 82. The bottom layer 84 is one of the moisture absorbing clays and of the non-swelling type. The layer 84 may represent shale, gravel or other porous basis for layer 86 which is principally intended to represent clay in which the roots of the plant 82 grow. The top layer 88 of soil covers the water store composed of layers 84 and 86 or merely one of the two layers. Necessary nutrients are obtained from the soil and the soil serves the important function of preventing rapid evaporation from the water store so that the flower lovers may water their flowers once a month or go on a month's vacation without worry of their neighbors, relatives or hired help watering their flowers while on vacation.

It is understood that various changes may be made in the invention without departing from the scope of the following claims.

What is claimed as new is as follows:

1. A process for sub-irrigation of a body of soil, including the step of providing an earth-covered trench having in its bottom a layer of bentonite and a series of vertical holes from said bottom to the water table, each of said vertical holes opening directly into the bottom of the trench and containing a capillary material of absorbing capacity different from the bentonite in the trench.

2. The subject matter of claim 1, the said capillary material and the bentonite being connected to form a bond, so that the moisture elevated by capillary action will be absorbed by the bentonite and moved horizontally for absorption by the roots of vegetation.

3. The subject matter of claim 1, said capillary material being diatomaceous earth.

4. In a method of capillary sub-irrigation of soil for plants, the step of providing in said soil a horizontal opening containing bentonite and a vertical opening containing diatomaceous earth, the vertical opening extending downward from the bottom of the horizontal opening; and the further step of causing the bonding of the bentonite and the diatomaceous earth to form a continuous path of travel for the irrigating liquid.

References Cited in the file of this patent

UNITED STATES PATENTS

| | | |
|---|---|---|
| 1,171,558 | Taylor | Feb. 15, 1916 |
| 1,171,559 | Taylor | Feb. 15, 1916 |
| 1,251,315 | Wingett | Dec. 25, 1917 |
| 1,608,917 | Widdis | Nov. 30, 1926 |
| 2,351,256 | Fischer | June 13, 1944 |
| 2,570,537 | Finch | Oct. 9, 1951 |
| 2,734,313 | Morrison | Feb. 14, 1956 |

FOREIGN PATENTS

| | | |
|---|---|---|
| 201,389 | Germany | Sept. 7, 1908 |
| 66,056 | Switzerland | Aug. 11, 1913 |